US009546678B2

(12) United States Patent
Wu et al.

(10) Patent No.: US 9,546,678 B2
(45) Date of Patent: Jan. 17, 2017

(54) STRUCTURAL JOINT WITH MULTI-AXIS LOAD CARRYING CAPABILITY

(71) Applicant: The United States of America as represented by the Administrator of the National Aeronautics and Space Adminstration, Washington, DC (US)

(72) Inventors: K. Chauncey Wu, Yorktown, VA (US); Robert A. Martin, Yorktown, VA (US); Brian K. Stewart, Hayes, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 437 days.

(21) Appl. No.: 14/105,757

(22) Filed: Dec. 13, 2013

(65) Prior Publication Data

US 2015/0252837 A1    Sep. 10, 2015

Related U.S. Application Data

(60) Provisional application No. 61/737,182, filed on Dec. 14, 2012.

(51) Int. Cl.
*F16C 3/02* (2006.01)
*F16C 7/02* (2006.01)
(Continued)

(52) U.S. Cl.
CPC ............. *F16C 3/026* (2013.01); *F16C 3/02* (2013.01); *F16C 3/023* (2013.01); *F16C 7/02* (2013.01);
(Continued)

(58) Field of Classification Search
CPC ............. Y10T 403/3986; Y10T 403/7098; Y10T 403/7073; F16B 7/00; F16D 2001/102; A63B 17/02; A63B 17/04; F16C 3/02; F16C 3/023; F16C 3/026; F16C 2326/43; F16L 9/147; E04C 5/03
(Continued)

(56) References Cited

U.S. PATENT DOCUMENTS 1,404,198 A * 1/1922 Gerson ............... E04C 5/03
52/852
2,292,548 A * 8/1942 Schenk ............... E04G 17/0658
219/58
(Continued)

FOREIGN PATENT DOCUMENTS

CA        2455927 A1 * 2/2005 ......... B28B 23/0068
DE   202015102745    * 9/2015 ............ F16B 2/22
(Continued)

*Primary Examiner* — Ryan Kwiecinski
(74) *Attorney, Agent, or Firm* — Andrea Z. Warmbier (57) ABSTRACT

A structural joint is formed of a mandrel having a plurality of bumps and dimples formed thereon which is fitted into a sleeve. The bumps and dimples form a non-circular geometry at all points along the length of the mandrel. The bumps are defined by surfaces which have $1^{st}$ and $2^{nd}$ derivatives which are continuous.

20 Claims, 4 Drawing Sheets

(51) Int. Cl.
*A63B 17/04* (2006.01)
*F16D 1/10* (2006.01)
*A63B 17/02* (2006.01)

(52) U.S. Cl.
CPC ............... *A63B 17/02* (2013.01); *A63B 17/04* (2013.01); *F16C 7/026* (2013.01); *F16C 2326/43* (2013.01); *F16D 2001/102* (2013.01); *Y10T 403/7073* (2015.01); *Y10T 403/7098* (2015.01)

(58) Field of Classification Search
USPC ....... 52/655.1, 850, 856, 857; 403/200, 383; 138/147, 172, 177, DIG. 11
See application file for complete search history.

(56) References Cited

U.S. PATENT DOCUMENTS

| | | | | |
|---|---|---|---|---|
| 2,663,321 A * | 12/1953 | Jantsch | ............... | B02C 2/005 138/38 |
| 2,779,279 A * | 1/1957 | Maiwurm | ............ | B21D 39/042 102/293 |
| 3,376,686 A * | 4/1968 | Salm | ................... | E04C 5/20 52/687 |
| 3,513,606 A * | 5/1970 | Jones | ................ | A47B 47/0016 211/182 |
| 3,963,055 A * | 6/1976 | DeRosa | ............ | F02M 37/0017 123/198 DB |
| 4,622,840 A * | 11/1986 | Diffenderfer | ............. | B21C 3/00 72/276 |
| 4,807,351 A * | 2/1989 | Berg | ...................... | B21D 26/14 29/419.2 |
| 4,819,402 A * | 4/1989 | Schneider | ............ | A63H 33/108 403/359.6 |
| 4,832,382 A * | 5/1989 | Kapgan | ................ | F16B 1/0014 174/DIG. 8 |
| 5,043,217 A * | 8/1991 | Peters | ................... | F16C 3/026 428/397 |
| 5,165,881 A * | 11/1992 | Wicen | .................. | F01C 21/08 264/274 |
| 5,556,092 A * | 9/1996 | Theken | ................ | A63B 49/08 16/430 |
| 5,911,798 A * | 6/1999 | Arnold | ................. | B25G 1/043 81/177.1 |
| 6,056,018 A * | 5/2000 | Renaud | ................ | F16L 11/111 138/121 |
| 6,358,027 B1 * | 3/2002 | Lane | .................... | F04C 2/1071 418/1 |
| 6,379,763 B1 * | 4/2002 | Fillman | .................. | B32B 1/08 138/121 |
| 6,568,076 B2 * | 5/2003 | Bottos | .................. | F04C 2/1075 29/888.02 |
| 6,702,776 B2 * | 3/2004 | Quinn | ............... | A61M 25/0069 138/177 |
| 7,284,300 B1 * | 10/2007 | Bruns | ................... | B25G 1/102 16/110.1 |
| 7,419,435 B2 * | 9/2008 | Borges | .................. | F16C 3/023 464/181 |
| 2012/0316038 A1 * | 12/2012 | Beckwith | ............ | A63G 21/00 482/35 |
| 2013/0337925 A1 * | 12/2013 | Hsu | ......................... | A63G 9/00 472/125 |
| 2014/0128168 A1 * | 5/2014 | Laskey | .................... | F16C 3/02 464/183 |
| 2015/0013088 A1 * | 1/2015 | Li | .......................... | F21V 33/004 15/167.1 |

FOREIGN PATENT DOCUMENTS

| | | | | |
|---|---|---|---|---|
| IT | | EP 2745951 A1 * | 6/2014 | ............... F16C 3/02 |
| JP | | 4414384 A1 * | 10/1994 | ........... B29C 53/583 |

\* cited by examiner

STRUCTURAL JOINT WITH MULTI-AXIS LOAD CARRYING CAPABILITY

CROSS-REFERENCE TO RELATED PATENT APPLICATION

This patent application claims the benefit of and priority to U.S. Provisional Application Ser. No. 61/737,182, filed on Dec. 14, 2012, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

The present invention relates to a structural joint for use in a structure, preferably an aerospace structure, powertrain drive shafts or torque tubes for automobiles and other vehicles, truss members for lightweight deployable and erectable structures, sporting and exercise equipment.

BACKGROUND OF THE INVENTION

Aerospace structures must have both high performance (i.e., structural stiffness and strength) and low mass. These demanding requirements inherently conflict, and are made even more challenging in that separate subcomponents often must be connected together to create larger structures. Ideally, interfaces or joints would also have the same high performance and low mass as the structural components that are being assembled. In addition, the forces and moments that are transferred across the joints are rarely uniaxial, and are quite commonly a combination of loads applied along different axes.

An example of a prior art structural joint is provided in U.S. Pat. No. 6,379,763 to Fillman. Fillman provides a joint having an elongate cylindrical body with smooth-edged, substantially sinusoidal undulations. The body is enveloped in a sleeve. In order to prevent rotation between the body and the sleeve, the smooth-edged, substantially sinusoidal undulations are interrupted with flats which engage with the sleeve.

Another example of a prior art structural joint is provided in U.S. Pat. No. 7,419,435 to Borges. Borges provides non-round geometries at the ends of the body with a flat neck between the non-round ends which provides a step geometric change along the length of the body. Each non-round cross-section is continuous in Borges, but the 2nd derivatives are not continuous for the axial curves.

Efficiency of a joint is maximized when the part-part load transfer is continuous along the length of the joint. Bolted, pinned and/or riveted joints have disproportionately high load transfer at the first axial row of fasteners. Glued joints transfer most of the load at the two ends of the joint. As discussed above, the prior art has geometric discontinuities (cusp or step geometric changes) which concentrate load transfer in a highly localized manner in the vicinity of the discontinuities.

A structural joint is provided herein which provides improvements to existing joints and which overcomes the disadvantages presented by the prior art. Other features and advantages will become apparent upon a reading of the attached specification, in combination with a study of the drawings.

BRIEF SUMMARY OF THE INVENTION

A structural joint is formed of a mandrel having a plurality of bumps and dimples formed thereon which is fitted into a sleeve. The bumps and dimples form a non-circular geometry at all points along the length of the mandrel. The bumps are defined by surfaces which have $1^{st}$ and $2^{nd}$ derivatives which are continuous.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE INVENTION

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A structural joint 20, 120 is provided for connecting structural elements 22 together that has the capability to sustain discrete loads applied to the structural joint 20. 120. The structural joint 20, 120 is capable of efficient transfer of all six load components (Fx, Fy, Fz, Mxx, Myy, Mzz). The structural joint 20, 120 may be used in a structure, preferably an aerospace structure, powertrain drive shafts or torque tubes for automobiles and other vehicles, truss members for lightweight deployable and erectable structures, sporting and exercise equipment. FIGS. 1-8 shows a structural joint 20 in accordance with a first illustrative embodiment of the present invention and FIGS. 9-16 shows a structural joint 120 in accordance with a second illustrative embodiment of the present invention. Each structural joint 20, 120 is formed of an internal mandrel 24, 124 fitted within an external sleeve 26, 126. The mandrel 24, 124 is integrated into the sleeve 26, 126 during fabrication. The mandrel 24, 124 and sleeve 26, 126 can be fabricated from metallic or polymeric composite materials, resulting in substantial weight savings. The cross-section of the structural joint 20, 120 also enforce uniformity of the structural characteristics, which minimizes variations and undesirable stress concentrations.

In each embodiment, the mandrel 24, 124 is a nearly cylindrical closed-section defining a circumference, and having a first end 26, 126 and a second, opposite end 28, 128a which defines a length between the ends 26, 126, 28, 128a. The mandrel 24, 124 defines a longitudinal central axis 29, 29a extending along the length thereof. The mandrel 24, 124 may be machined, forged or cast from metallic materials, or molded from non-metallic materials.

In each embodiment, the exterior surface of the mandrel 24, 124 has a plurality of surfaces forming convex bumps and surfaces forming concave dimples provided thereon. Along the length of the mandrel 24, 124, the bumps alternate with dimples and define a plurality of sets. When going around the circumference of the mandrel 24, 124, bumps in one set are adjacent to dimples in the adjacent sets such that going around the circumference of the mandrel 24, 124, bumps alternate with dimples. As a result of this geometry, non-round cross-sections, when taken perpendicular to the central axis 29, 129 is provided at all points along the length of the mandrel 24, 124. As shown in the illustrative examples, the first embodiment has six sets of bumps 30a-30f and dimples 32a-32f provided thereon, and the second embodiment has eight sets of bumps 130a-130h and dimples 132a-132h provided thereon. Each set can contain as many alternating bumps and dimples as desired, however, at least three bumps and three dimples are provided in each set.

In each set, the bumps 30a-30f, 130a-130h and dimples 32a-32f, 132a-132h transition into each other along the length of the mandrel 24, 124 to form smooth curves along all cross-sections taken along the length of the mandrel 24, 124. In each set, the crest of each bump 30a-30f, 130a-130h preferably falls along the same radius extending from the central axis 29, 129. In each set, the trough of each dimple 32a-32f, 132a-132h preferably falls along the same radius extending from the central axis 129. When going around the circumference of the mandrel 24, 124, adjacent bumps and dimples smoothly transition into each other.

In the first illustrative embodiment of FIGS. 1-8, the bumps 30a, 30c, 30e in the first, third and fifth sets align with each other going around the circumference of the mandrel 24. That is, the first bump 30a, 30c, 30e (the one closest to the end 26) in each of the first, third and fifth sets has its crest at the same distance from the end 26 of the mandrel 24, the second bump 30a, 30c, 30e (the one second closest to the end 26) in each of the first, third and fifth sets has its crest at the same distance from the end 26 of the mandrel 24, etc. Likewise, the bumps 30b, 30d, 30e in the second, fourth and sixth sets align with each other going around the circumference of the mandrel 24. That is, the first bump 30b, 30d, 30e (the one closest to the end 26) in each of the second, fourth and sixth sets has its crest at the same distance from the end 26 of the mandrel 24, the second bump 30b, 30d, 30e (the one second closest to the end 26) in each of the second, fourth and sixth sets has its crest at the same distance from the end 26 of the mandrel 24, etc. The bumps 30a, 30c, 30e in the first, third and fifth sets are offset 120 degrees from each other. The bumps 30b, 30d, 30f in the second, fourth and sixth sets are offset 120 degrees from each other. The mandrel 24 can be terminated along any point of the sets of bumps 30a-30f and dimples 32a-32f.

Likewise in the second illustrative embodiment of FIGS. 9-16, the bumps 130a, 130c, 130e, 130g in the first, third, fifth and seventh sets preferably align with each other around the circumference of the mandrel 124. That is, the first bump 130a, 130c, 130e, 130g (the one closest to the end 126) in each of the first, third, fifth and seventh sets has its crest at the same distance from the end 126 of the mandrel 124, the second bump 130a, 130c, 130e, 130g (the one second closest to the end 126) in each of the first, third, fifth and seventh sets has its crest at the same distance from the end 126 of the mandrel 124, etc. Likewise, the bumps 130b, 130d, 130f, 130h in the second, fourth, sixth and eighth sets preferably align with each other around the circumference of the mandrel 124. That is, the first bump 130b, 130d, 130f, 130h (the one closest to the end 126) in each of the second, fourth, sixth and eighth sets has its crest at the same distance from the end 126 of the mandrel 124, the second bump 130b, 130d, 130f, 130h (the one second closest to the end 126) in each of the second, fourth, sixth and eighth sets has its crest at the same distance from the end 126 of the mandrel 124, etc. The bumps 130a, 130c, 130e, 130g in the first, third, fifth and seventh sets are offset 90 degrees from each other. The bumps 130b, 130d, 130f, 130h in the second, fourth, sixth and eighth sets are offset 90 degrees from each other. The mandrel 124 can be terminated along any point of the sets of bumps 130a-130h and dimples 132a-132h.

In each embodiment, when going around the circumference of the mandrel 24, 124, bumps in one set are adjacent to dimples in the adjacent sets. That is, as shown in the first illustrative embodiment, when going around the circumference of the mandrel 24, the bumps 30a in the first set are adjacent to respective dimples 32b, 32f in the second and sixth sets, the bumps 30b in the second set are adjacent to respective dimples 32a, 32c in the first and third sets, the bumps 30c in the third set are adjacent to respective dimples 32b, 32d in the second and fourth sets, the bumps 30d in the fourth set are adjacent to respective dimples 32c, 32e in the third and fifth sets, the bumps 30e in the fifth set are adjacent to respective dimples 32d, 32f in the fourth and sixth sets, and the bumps 30f in the sixth set are adjacent to respective dimples 32e, 32a in the fifth and first sets. The bumps 30a-30f smoothly transition into the adjacent dimples 32a-32f going around the circumference of the mandrel 24. Likewise, as shown in the second illustrative embodiment, when going around the circumference of the mandrel 124, the bumps 130a in the first set are adjacent to respective dimples 132b, 132h in the second and eighth sets, the bumps 130b in the second set are adjacent to respective dimples 132a, 132c in the first and third sets, the bumps 130c in the third set are adjacent to respective dimples 132b, 132d in the second and fourth sets, the bumps 130d in the fourth set are adjacent to respective dimples 132c, 132e in the third and fifth sets, the bumps 130e in the fifth set are adjacent to respective dimples 132d, 132f in the fourth and sixth sets, the bumps 130f in the sixth set are adjacent to respective dimples 132e, 132g in the fifth and seventh sets, the bumps 130g in the seventh set are adjacent to respective dimples 132f, 132h in the sixth and eighth sets, and the bumps 130h in the eighth set are adjacent to respective dimples 130g, 130a in the seventh and first sets. The bumps 130a-130h smoothly transition into the adjacent dimples 132a-132h going around the circumference of the mandrel 124.

In each embodiment, the bumps and dimples provide the non-round geometry along all points of the length of the mandrel 24, 124. The bumps and dimples provide a non-circular cross-sectional geometry with piecewise continuous 1st and 2nd derivatives in the x, y and z directions at all points along the length of the mandrel 24, 124. The bumps and dimples provide a smooth multi-lobed non-axisymmetric cross-section that is both rotated around the central x-axis 29, 129 and translated along the central x-axis 29, 129 of the mandrel 24, 124. The bumps and dimples can be rotated any desired degree between +/−360/n degrees, where n is the number of lobes. The "lobes" are defined by the bumps and can be clearly seen in an end view of the mandrel 24, 124. As shown in the figures, the first illustrative embodiment of the structural joint 20 provides a smooth three "lobed", non-axisymmetric cross-section that is both rotated 60 degrees and translated a predetermined distance along the longitudinal central axis 29 of the mandrel 24, and the second illustrative embodiment of the structural joint 120 provides a four "lobed", non-axisymmetric cross-section that is both rotated 45 degrees and translated along the longitudinal central axis 129 of the mandrel 124. The "lobes" are defined by the bumps and in the first illustrative embodiment can be clearly seen in the end view of FIG. 5, see the first group of "lobes" 30a, 30c, 30e and the second group of lobes 30b, 30d, 30f (the bumps and dimples 30a, 32a are rotated around the x-axis 60 degrees and translated along the x-axis a predetermined amount to form the bumps and dimples 30b, 32b, the bumps and dimples 30b, 32b are rotated around the x-axis 60 degrees and translated along the x-axis a predetermined amount to form the bumps and dimples 30c, 32c, etc. going around the circumference of the mandrel 24). The "lobes" can be clearly seen in the second illustrative embodiment in the end view of FIG. 13, see the first group of "lobes" 130a, 130c, 130e, 130g and the second group of lobes 130b, 130d, 130f, 130g (the bumps and dimples 130a, 132a are rotated around the x-axis 45 degrees and translated along the x-axis a predetermined amount to form the bumps and dimples 130b, 132b, the bumps and dimples 130b, 132b are around the x-axis 45 degrees and translated along the x-axis a predetermined amount to form the bumps and dimples 130c, 132c, etc. going around the circumference of the mandrel 124). That is, in the first illustrative embodiment shown in FIGS. 1-8, the six sets of bumps 30a-30f and dimples 32a-32f in the orientation discussed above provide the non-round geometry along all points of the length of the mandrel 24, and in the second embodiment shown in FIGS. 9-16, the eight sets of bumps 130a-130h and dimples 132a-132h in the orientation discussed above provide the non-round geometry along all points of the length of the mandrel 124.

Figure 1:
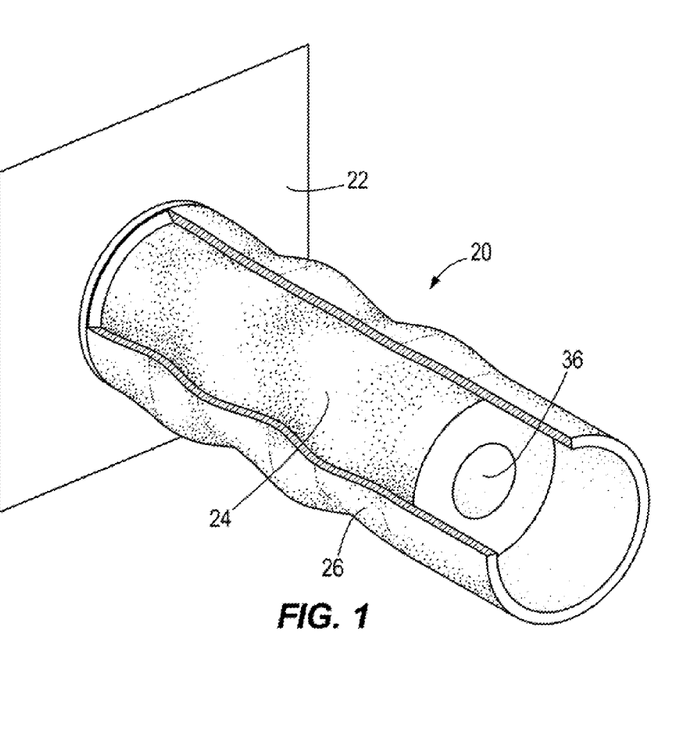
FIG. 1 is a perspective view of a structural joint which incorporates the features of a first embodiment of the present invention, the structural joint shown with a sleeve cut away to show a mandrel therein.
Figure 2:
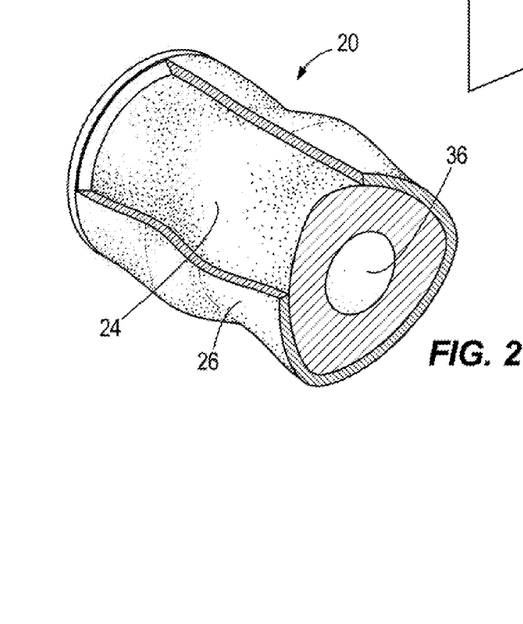
FIG. 2 is a perspective view of the structural joint of FIG. 1 shown cut-away along the length thereof.
Figures 3, 4, 5, 6, 7, 8:
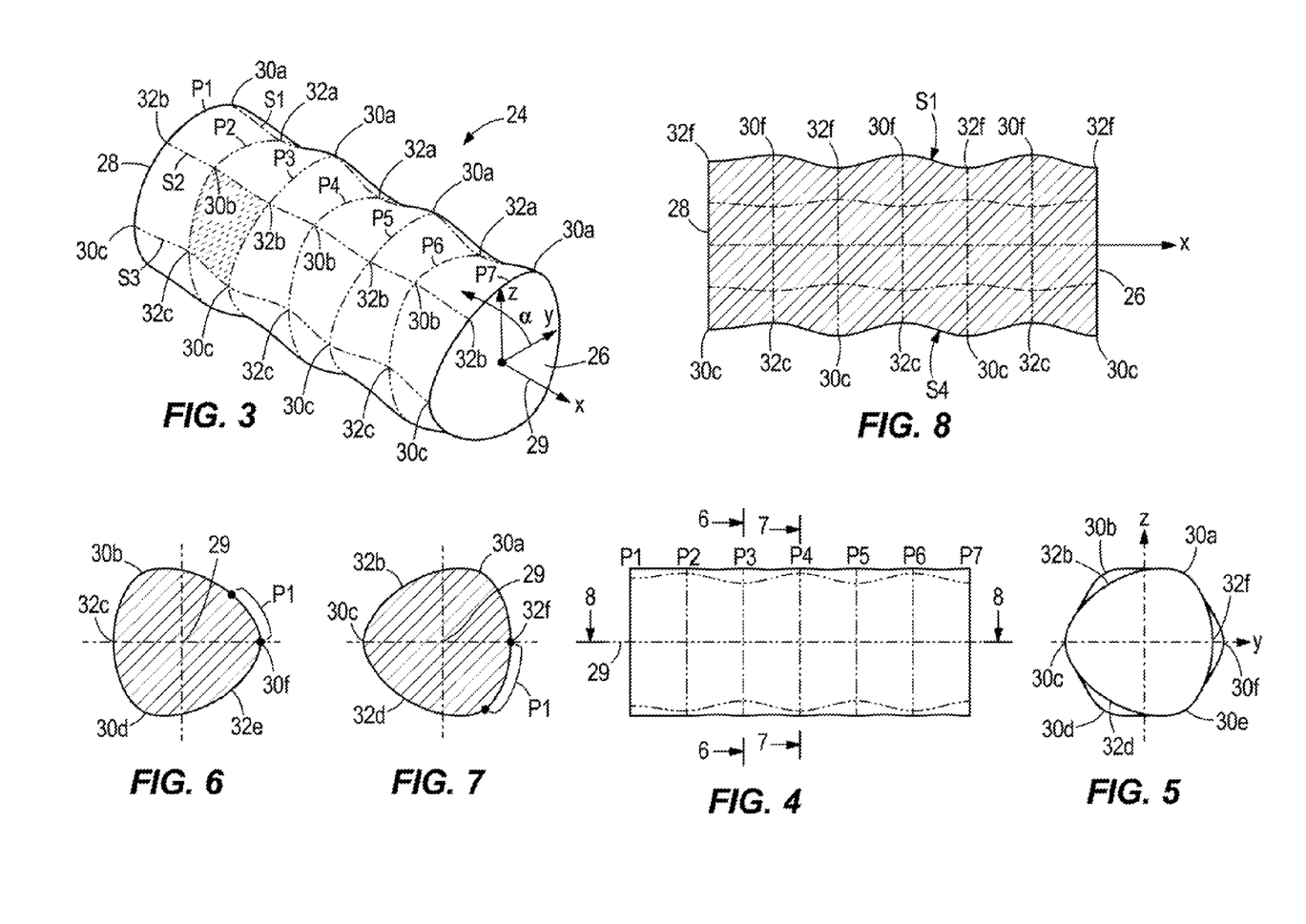
FIG. 3 is a perspective view of the mandrel.
FIG. 4 is a side elevation view of the mandrel.
FIG. 5 is an end elevation view of the mandrel.
FIG. 6 is a partial cross-sectional view of the mandrel along line VI-VI of FIG. 4.
FIG. 7 is a partial cross-sectional view of the mandrel along line VII-VII of FIG. 4.
FIG. 8 is a cross-sectional view of the mandrel along line VIII-VIII of FIG. 4.
Figures 9, 10:
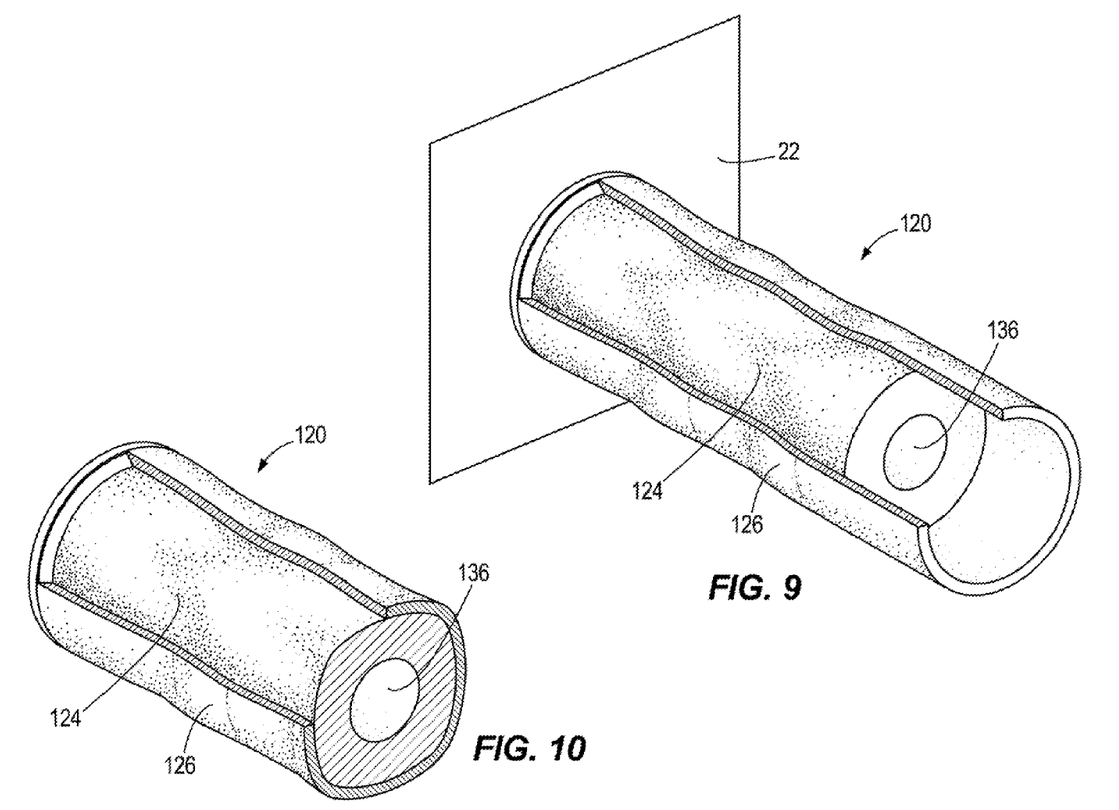
FIG. 9 is a perspective view of a structural joint which incorporates the features of a second embodiment of the present invention, the structural joint shown with a sleeve cut away to show a mandrel therein.
FIG. 10 is a perspective view of the structural joint of FIG. 9 shown cut-away along the length thereof.
Figure 11:
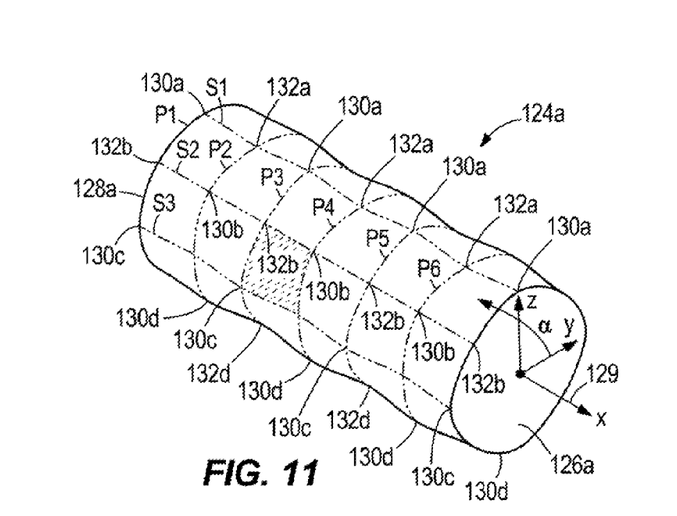
FIG. 11 is a perspective view of the mandrel of FIG. 9.
Figure 12:
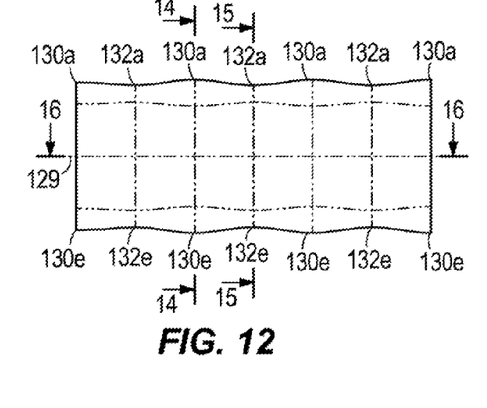
FIG. 12 is a side elevation view of the mandrel of FIG. 9.
Figure 13:
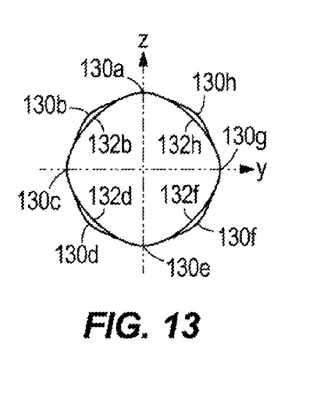
FIG. 13 is an end elevation view of the mandrel of FIG. 9.
Figure 14:
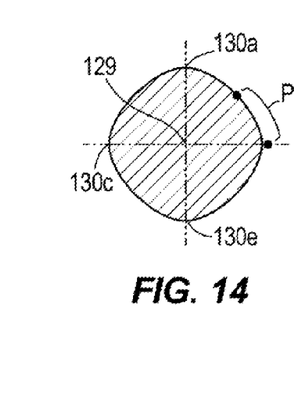
FIG. 14 is a partial cross-sectional view of the mandrel along line XIV-XIV of FIG. 12.
Figure 15:
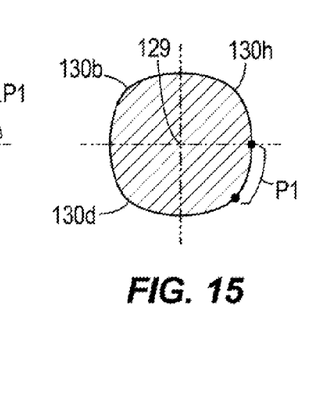
FIG. 15 is a partial cross-sectional view of the mandrel along line XV-XV of FIG. 12.
Figure 16:
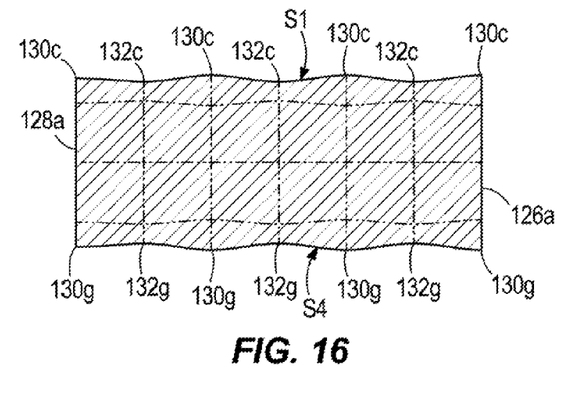
FIG. 16 is a cross-sectional view of the mandrel along line XVI-XVI of FIG. 12.

The geometry of the mandrel 24, 124 is generated by employing primitives to drive the generation of the complex, compound curvature surfaces which form the bumps and dimples. The mandrel 24, 124 is formed by generating a surface that is continuous, with continuous 1st derivatives and at least piecewise continuous 2nd derivatives at every point on the surface. The surface may be generated by defining primitives, curves that define the boundary of the surface at specific planes. The surface depicted in the end elevation views FIGS. 5 and 13 may be generated by defining primary curves at each point along the x-axis (in the y-z plane), defined as P1-P7 in FIG. 3, as well as secondary curves that traverse generally in the x-direction, defined as S1-S6 in FIG. 3, some of which are depicted in FIG. 3. The primary curves P1-P7 and the secondary curves S1-S6 intersect at right angles to each other. Surfaces are "knitted" between the primary curves P1-P7 and the secondary curves S1-S6 by interpolating the "patches" created by the boundaries of intersecting the P and S curves. A "knitted" patch is shown shaded in FIGS. 3 and 22. The mandrel 24 in FIGS. 1-8 was generated by constructing a 3-sided closed curve P1 that meets the mathematical conditions specified as a primary primitive curve (defined below). The same curve P1 was then translated and rotated 60 degrees to create curve P2. Accordingly, FIG. 7 shows the same curve P1 as the curve P1 in FIG. 1, but rotated 60 degrees and translated some distance in the x-direction, and FIG. 8 shows the same curve P1 as the curve P1 in FIG. 1, but rotated 120 degrees and translated some distance in the x-direction. In a like manner, the mandrel 124 of FIGS. 9-16 was generated by constructing a 4-sided closed curve that meets the mathematical conditions specified as a primary primitive curve (labeled P1). The second cross section was then created by translating the curve P1 some distance in the x-direction, and rotating it 45 degrees. Using the defined reference frame, the primary curves have the property that the 1st and 2nd derivatives of z with respect to y, dz/dy, and $d^2z/dy^2$ respectively, are at least piecewise continuous. The secondary curves have the property that the 1st and 2nd derivatives of z with respect to x are at least piecewise continuous, i.e. dz/dx, and $d^2z/dx^2$ respectively. There are a number of functional forms that satisfy these conditions, and the mandrel 24, 124 includes all functional forms that satisfy this mathematical criteria and is not limited to the specific embodiments depicted in the figures. The primary curves form a smooth, non-circular geometry at all points along the length of the mandrel 24, 124, which allows the efficient transfer of torsional loads between the mandrel 24, 124 and the sleeve 26, 126 without employing discontinuities in geometry such as flats, grooves, slots, fasteners or other such devices as is used in the prior art.

The embodiments are described mathematically in terms of coordinate geometry (local point definitions), 1st derivatives (local slope) and 2nd derivatives (local curvature). The present invention uses primitives with continuous 1st and 2nd derivatives. Continuous 2nd derivatives are used as a measure of "smoothness" of transitions from one section of a curve to another.

Candidate functional forms for the primitives can be written as:

a 3-sided polygon or a 4-sided polygon is based upon an n-sided polygon profile;

$$x = \left(\frac{D_I}{2} + e\right)\cos(\alpha) - e \cdot \cos(n\alpha)\cos(\alpha) - n \cdot e \cdot \sin(n\alpha)\sin(\alpha)$$

-continued $$x = \left(\frac{D_1}{2} + e\right)\sin(\alpha) - e \cdot \cos(n\alpha)\sin(\alpha) - n \cdot e \cdot \sin(n\alpha)\cos(\alpha)$$

Where n=3 or n=4
Note that any number of sides (n can be any integer) can be employed to create non-circular, continuous geometry.

The 4-sided version can also be created as a continuous profile by use of a super-ellipse generator equation (also known as the Lame curve):

$$\left|\frac{x}{a}\right|^n + \left|\frac{y}{b}\right|^n = 1$$

Where the shape approaches a sharp-cornered rectangle as n→∞, and n>=2

All of these functions are continuous, as are their $1^{st}$ and $2^{nd}$ derivatives. The embodiments herein are exemplary and may take other forms, however, it is critical that the function, and its $1^{st}$ and $2^{nd}$ derivatives are continuous. With regard to the axial curves, the axial curves may be any continuous or piecewise continuous function with continuous $1^{st}$ and at least piecewise continuous $2^{nd}$ derivatives. Numerous polynomial and transcendental functions fit that definition.

The non-circular geometry of the mandrels 24, 124 with piecewise continuous $1^{st}$ and $2^{nd}$ derivatives in the x, y and z directions results in more uniform load transfer along the central axis 29, 129, along with numerous other attributes, such as continuous surfaces minimize stress concentrations, improved transfer of load from part-part, the joint is capable of efficient transfer of all six load components (Fx, Fy, Fz, Mxx, Myy, Mzz), the structural joint 20, 120 can withstand internal and external hydrostatic pressure, thus it could serve a dual role as structural member plus convey fluids through the structural joint 20, 120, the uniform nature of load transfer increases the amount of energy to cause structural failure, making it an excellent energy absorber for impact or other dynamic events, improved torsional load transfer without reliance upon discontinuous features (flats, extensions, cusps), the structural joint 20, 120 transfers all six load components efficiently even in the absence of an adhesive bond between the sleeve 26, 126 and the mandrel 24, 125.

In each embodiment, because the bumps 30a-30f, 130a-130h preferably have the same radius, a constant perimeter is formed along the length of the mandrel 24, 124. This enables the mandrel 24, 124 to be easily assembled with the sleeve 26, 126 because the sleeve 26, 126 can be slid along the length of the mandrel 24, 124. The sleeve 26, 126 can be made of a unidirectional composite material and can be wrapped circumferentially over and around the mandrel 24, 124. This provision of the sleeve 26, 126 provides additional strength and stiffness as this material must be broken to separate the structural joint 20, 120. Preferably, the sleeve 26, 126 is designed to closely conform to the shape of the mandrel 24, 124. The area and moment of inertia of the cross-section external perimeter of the mandrel 24, 124 can be selected to be nearly equal to those of the sleeve 26, 126. This feature provides continuity and near-uniformity of the overall structural characteristics across the mandrel-sleeve interface, which reduces undesirable stress concentrations and mitigates failure of the structural joint.

The mandrel 24, 124 can include an axial bore 36 having internal threads over at least a part of its length. The bore 36 is configured to receive the end of a bolt or threaded rod for attachment to another component 22, such as another strut or a panel, for example. In some embodiments the mandrel 24, 124 may have an axially extending stud, with or without threads, or other form of coupling in addition to or in place of the threads in the bore 36 for attachment to the adjacent component 22.

The mandrel 24, 124 may be fabricated using conventional or numerically controlled machining techniques for metallic materials, or it may be molded from non-metallic materials. The mandrel 24, 124 is then integrated during manufacture with the sleeve 26, 126. If both the mandrel 24, 124 and the sleeve 26, 126 are made from metal, they can be swaged together during integration. If the sleeve 26, 126 is made from a thermoplastic composite, it can be compression-molded directly onto the mandrel 24, 124 during integration. If the sleeve 26, 126 is made from a thermoset composite, the sleeve 26, 126 can be laid up on the mandrel 24, 124 by hand, and then cured, or by using automated manufacturing processes.

The non-circular geometry of the mandrel 24, 124 resists torque loading in the structural joint 20, 120 by restricting rotational movement of the mandrel 24, 124 relative to the sleeve 26, 126. More specifically, due to the complementary shape of the mandrel 24, 124 with the sleeve 26, 126, rotational movement of the mandrel 24, 124 is effectively prevented. In this regard, the outer surface of the bumps 30a-30f, 130a-130h bear against the inner surface of the sleeve 26, 126 at the interface between the bumps 30a-30f, 130a-130h and the sleeve 26, 126 and utilize mechanical advantage to resist torsional movement therebetween.

The profile of the cross-section of the mandrel 24, 124 along the length of the central axis 29, 129 provides for better axial loading capability of the structural joint 20, 120. More specifically, the bumps 30a-30f, 130a-130h along the length of the mandrel 24, 124 resist axial loading by restricting axial movement of the mandrel 24, 124 relative to the sleeve 26, 126. The bumps 30a-30f, 130a-130h bear against the inner surfaces of the sleeve 26, 126 at the interface between the bumps 30a-30f, 130a-130h and the sleeve 26, 126 and utilize mechanical advantage to resist axial movement therebetween.

While preferred embodiments of the present invention are shown and described, it is envisioned that those skilled in the art may devise various modifications of the present invention without departing from the spirit and scope of the appended claims.

The invention claimed is:

1. A structural joint comprising:
an elongate mandrel having opposite ends and a length defined therebetween, and an exterior surface with a plurality of bumps and dimples formed thereon, wherein the plurality of bumps and dimples alternate along the length and around a circumference of the mandrel to form non-circular transverse cross-sectional geometries at all points along the length of the mandrel, wherein each of the plurality of bumps is defined by a surface which has $1^{st}$ and $2^{nd}$ derivatives which are continuous; and
a sleeve surrounding the mandrel and having an interior surface conforming to the plurality of bumps and dimples on the mandrel such that the mandrel prevents torsional rotation of the mandrel relative to the sleeve and prevents axial translation of the mandrel relative to the sleeve.

2. The structural joint of claim 1, wherein the mandrel is formed of one or more metallic materials.

3. The structural joint of claim 1, wherein the mandrel is formed of one or more composite materials.

4. The structural joint of claim 1, wherein the mandrel and the sleeve are formed of metallic or composite materials.

5. The structural joint of claim 1, wherein the interior surface of the sleeve surrounding the mandrel includes bumps and dimples that closely conform to the plurality of bumps and dimples of the exterior surface of the mandrel.

6. The structural joint of claim 5, wherein the mandrel and the sleeve are formed of metallic or composite materials.

7. The structural joint of claim 1, wherein each of the plurality of bumps defines a crest having a radius which is equal to the radii of the crests of the other of the plurality of bumps.

8. The structural joint of claim 1, wherein the elongate mandrel includes an axial bore having internal threads over at least a part of the length of the mandrel.

9. The structural joint of claim 1, wherein the axial bore is attached to a component.

10. The structural joint of claim 1, wherein each of the plurality of dimples defines a trough having a radius that is equal to the radii of the troughs of the other of the plurality of dimples.

11. The structural joint of claim 1, wherein outer peripheries of a plurality of the non-circular transverse cross-sectional geometries are defined by a closed primary primitive curve with the $1^{st}$ derivative defining local slope and the $2^{nd}$ derivative defining local curvature.

12. A structural joint comprising:
an elongate mandrel having opposite ends and a length defined therebetween, and an exterior surface with a plurality of concave bumps and convex dimples formed thereon, wherein each of the plurality of concave bumps is adjacent to a first plurality of the plurality of convex dimples along the length of the mandrel and a second plurality of the plurality of convex dimples around a circumference of the mandrel and smoothly transitions into the adjacent dimples to form non-circular transverse cross-sectional geometries at all points along the length of the mandrel; and a sleeve surrounding the mandrel and having an interior surface conforming to the plurality of concave and convex dimples on the mandrel such that the mandrel prevents torsional rotation of the mandrel relative to the sleeve and prevents axial translation of the mandrel relative to the sleeve.

13. The structural joint of claim 12, wherein the mandrel is formed of one or more metallic materials.

14. The structural joint of claim 12, wherein the mandrel is formed of one or more composite materials.

15. The structural joint of claim 12, wherein the mandrel and the sleeve are formed of metallic or composite materials.

16. The structural joint of claim 12, wherein the interior surface of the sleeve surrounding the mandrel includes bumps and dimples that closely conform to the plurality of concave bumps and convex dimples of the exterior surface of the mandrel.

17. The structural joint of claim 16, wherein the mandrel and the sleeve are formed of metallic or composite materials.

18. The structural joint of claim 12, wherein each of the plurality of concave bumps defines a crest having a radius which is equal to the radii of the crests of the other of the plurality of concave bumps.

19. The structural joint of claim 12, wherein the elongate mandrel includes an axial bore having internal threads over at least a part of the length of the mandrel.

20. The structural joint of claim 19, wherein the axial bore is attached to a component.

* * * * *